United States Patent
Kawazu

(10) Patent No.: US 9,798,952 B2
(45) Date of Patent: Oct. 24, 2017

(54) IMAGE PROCESSING APPARATUS AND METHOD THEREFOR

(71) Applicant: CANON KABUSHIKI KAISHA, Tokyo (JP)

(72) Inventor: Ayuta Kawazu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 455 days.

(21) Appl. No.: 13/948,360

(22) Filed: Jul. 23, 2013

(65) Prior Publication Data

US 2014/0064627 A1 Mar. 6, 2014

(30) Foreign Application Priority Data

Aug. 29, 2012 (JP) .................................. 2012-188927
Jul. 2, 2013 (JP) .................................. 2013-139258

(51) Int. Cl.
*G06K 9/68* (2006.01)
*G06K 9/62* (2006.01)
*G06K 9/00* (2006.01)

(52) U.S. Cl.
CPC ....... *G06K 9/6202* (2013.01); *G06K 9/00899* (2013.01)

(58) Field of Classification Search
CPC ........... G06K 9/00899; G06K 9/00744; G06K 9/4671; G06K 9/4604; G06K 9/4652; G06K 9/6202; G06K 9/6219
See application file for complete search history.

(56) References Cited

U.S. PATENT DOCUMENTS

| | | | | |
|---|---|---|---|---|
| 6,272,245 B1* | 8/2001 | Lin | ...................... | G06K 9/6203 382/135 |
| 6,307,963 B1* | 10/2001 | Nishida | ................ | G06K 9/3241 382/170 |
| 8,160,293 B1* | 4/2012 | Fridrich | ............. | G06K 9/00899 382/100 |
| 2011/0243459 A1* | 10/2011 | Deng | ................... | G06K 9/6203 382/218 |
| 2013/0223731 A1* | 8/2013 | Kawazu | ................ | G06T 1/0028 382/165 |

(Continued)

OTHER PUBLICATIONS

Cao et al., A robust detection algorithm for copy-move forgery in digital images, 2012, Forensic Science International, vol. 214, pp. 33-43.*

(Continued)

*Primary Examiner* — Jonathan S Lee
(74) *Attorney, Agent, or Firm* — Rossi, Kimms & McDowell LLP

(57) ABSTRACT

A feature amount acquisition unit divides input image data into blocks each including a plurality of pixels and acquires the feature amounts of the blocks. A first detection unit detects a pair of two blocks whose feature amounts are approximate to each other and extract a first aggregate area in which one block of each of the pairs gathers and a second aggregate area in which the other block of each of the pairs gathers from the input image data. A second detection unit performs additional detection of adding a block adjacent to the first aggregate area to the first aggregate area, and adding a block adjacent to the second aggregate area to the second aggregate area.

13 Claims, 17 Drawing Sheets

(56) References Cited

U.S. PATENT DOCUMENTS

2014/0376812 A1* 12/2014 Kawazu ................ G06T 1/0028
382/195
2017/0091588 A1* 3/2017 Liu ..................... G06K 9/00899

OTHER PUBLICATIONS

Zhang et al., SURF-based Detection of Copy-Move Forgery in Flat Region, 2012, International Journal of Advancements in Computing Technology, vol. 4, No. 17, pp. 521-529.*

Bayram et al., An Efficient and Robust Method for Detecting Copy-Move Forgery, 2009, Acoustics, Speech and Signal Processing, pp. 1053-1056.*

Langille et al., An Efficient Match-based Duplication Detection Algorithm, 2006, Proceedings of the 3rd Canadian Conference on Computer and Robot Vision, pp. 1-8.*

Christlein, Vincent, Christian Riess, and Elli Angelopoulou. "On rotation invariance in copy-move forgery detection." 2010 IEEE International Workshop on Information Forensics and Security. IEEE, 2010.*

Chaitawittanun, Nattapol. "Detection of copy-move forgery by clustering technique." International Proceedings of Computer Science & Information Technology 50.6 (2012).*

Pan, Xunyu, and Siwei Lyu. "Region duplication detection using image feature matching." IEEE Transactions on Information Forensics and Security 5.4 (2010): 857-867.*

Quan, Xiaomei, and Hongbin Zhang. "Copy-move forgery detection in digital images based on local dimension estimation." Cyber Security, Cyber Warfare and Digital Forensic (CyberSec), 2012 International Conference on. IEEE, 2012.*

Amerini, Irene, et al. "A SIFT-based forensic method for copy-move attack detection and transformation recovery." IEEE Transactions on Information Forensics and Security 6.3 (2011): 1099-1110.*

Fridrich, A. Jessica, B. David Soukal, and A. Jan Lukáš. "Detection of copy-move forgery in digital images." in Proceedings of Digital Forensic Research Workshop. 2003.*

Li, Leida, Shushang Li, and Jun Wang. "Copy-move forgery detection based on PHT." Information and Communication Technologies (WICT), 2012 World Congress on. IEEE, 2012.*

Li, Weihai, and Nenghai Yu. "Rotation robust detection of copy-move forgery." Image Processing (ICIP), 2010 17th IEEE International Conference on. IEEE, 2010.*

Mandian, Babak, and Stanislav Saic. "Detection of copy—move forgery using a method based on blur moment invariants." Forensic science international 171.2 (2007): 180-189.*

Shivakumar, B. L., and Lt Dr S. Santhosh Baboo. "Detecting copy-move forgery in digital images: a survey and analysis of current methods." Global Journal of Computer Science and Technology (2010).*

Zhang, Ting, and Rang-ding Wang. "Copy-move forgery detection based on SVD in digital image." Image and Signal Processing, 2009. CISP'09. 2nd International Congress on. IEEE, 2009.*

Wang, Weihong, and Hany Farid. "Exposing digital forgeries in video by detecting duplication." Proceedings of the 9th workshop on Multimedia & security. ACM, 2007.*

Alin C. Popescu, et al. "Exposing Digital Forgeries by Detecting Duplication Image Regions" TR2004-515, Dartmouth College, Computer Science.

* cited by examiner

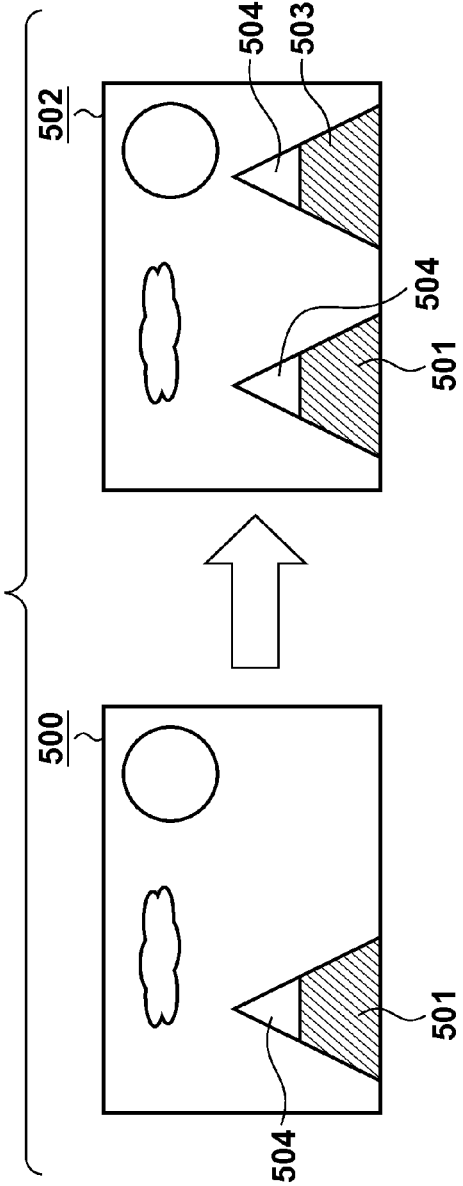
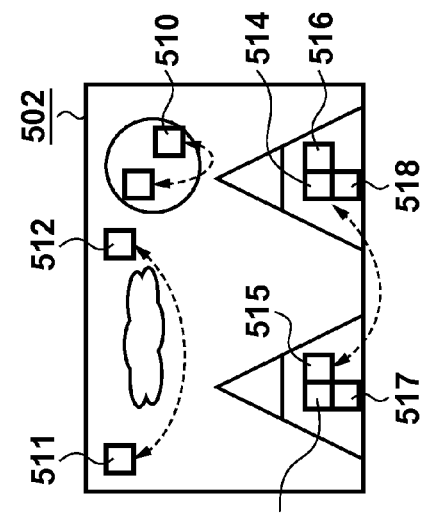
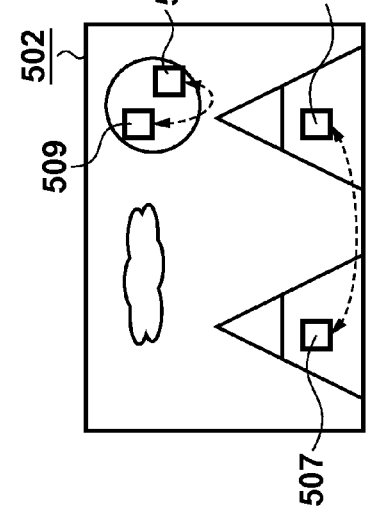
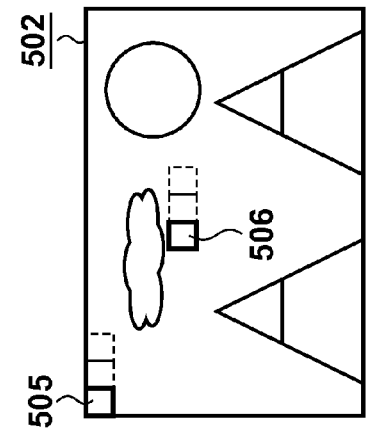
FIG. 3A
FIG. 3B
FIG. 3C
FIG. 3D

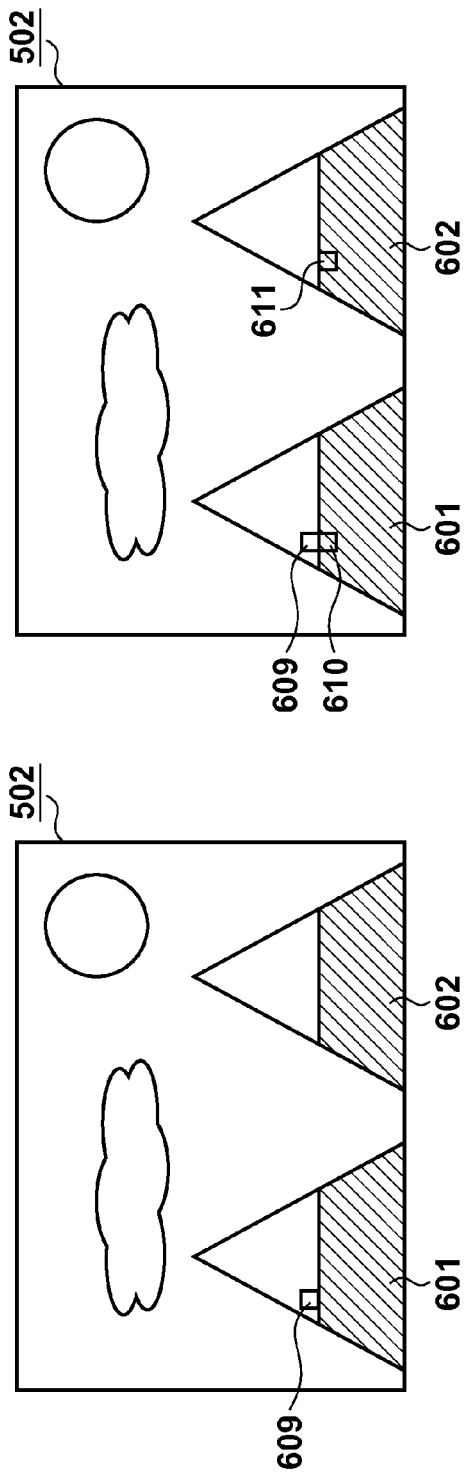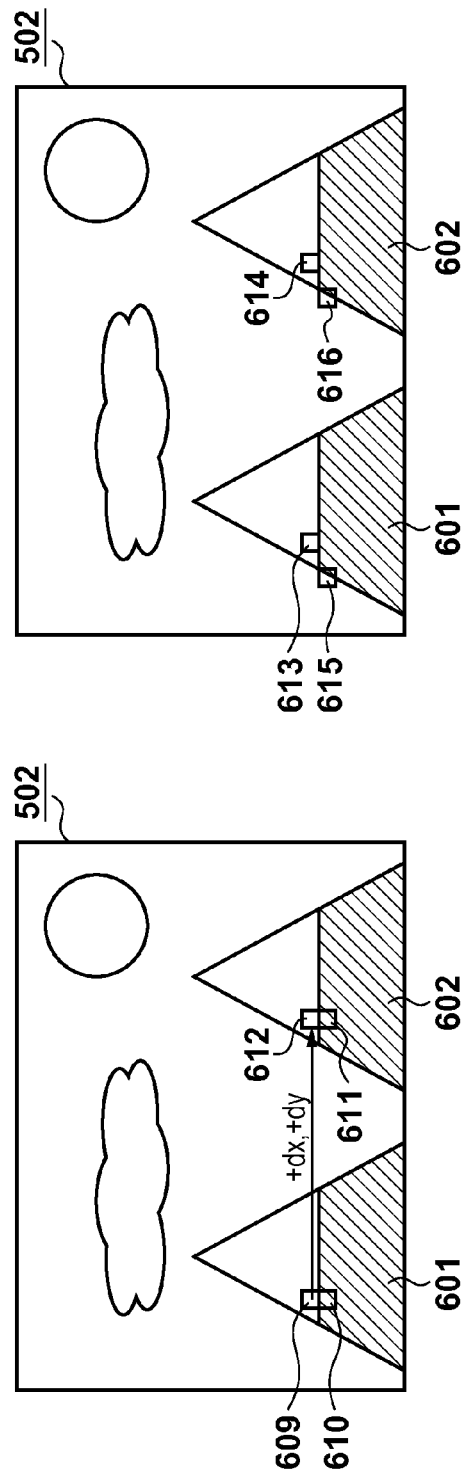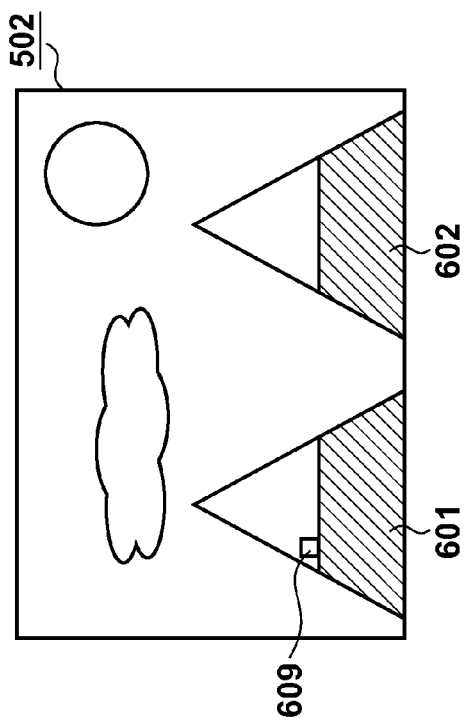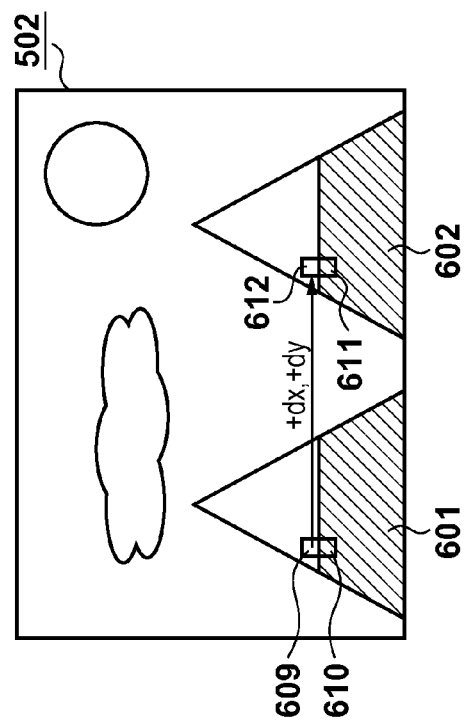

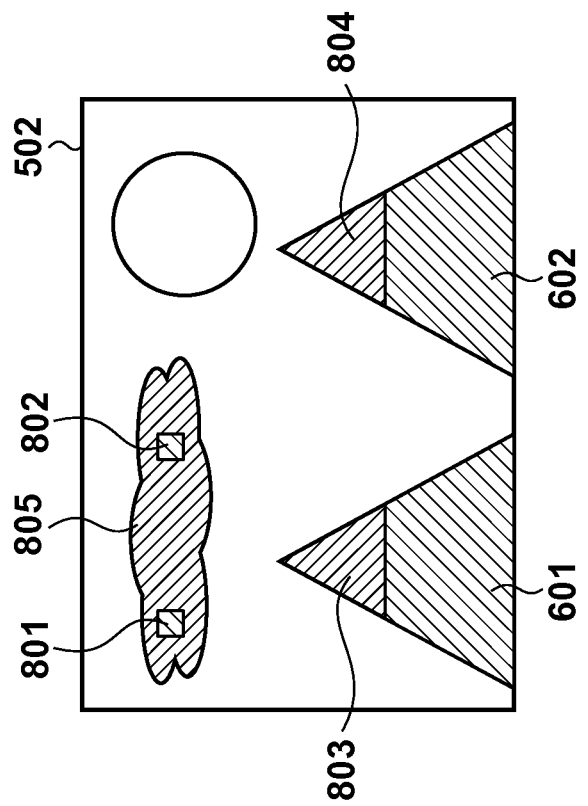
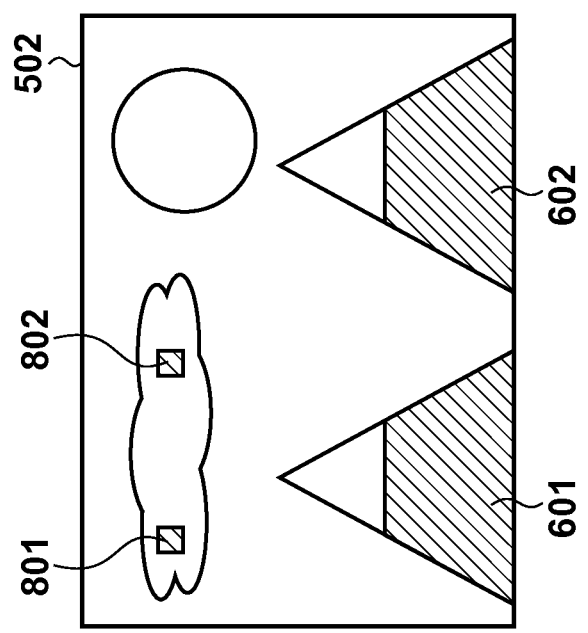

FIG. 10A

| $P_{11}$ | $P_{12}$ | $P_{13}$ | $P_{14}$ |
|---|---|---|---|
| $P_{21}$ | $P_{22}$ | $P_{23}$ | $P_{24}$ |
| $P_{31}$ | $P_{32}$ | $P_{33}$ | $P_{34}$ |
| $P_{41}$ | $P_{42}$ | $P_{43}$ | $P_{44}$ |

FIG. 10B

| $P_{11}$ | $P_{12}$ | $P_{13}$ | $P_{14}$ | $P_{21}$ | $P_{22}$ | $P_{23}$ | $P_{24}$ | $P_{31}$ | $P_{32}$ | $P_{33}$ | $P_{34}$ | $P_{41}$ | $P_{42}$ | $P_{43}$ | $P_{44}$ |
|---|---|---|---|---|---|---|---|---|---|---|---|---|---|---|---|

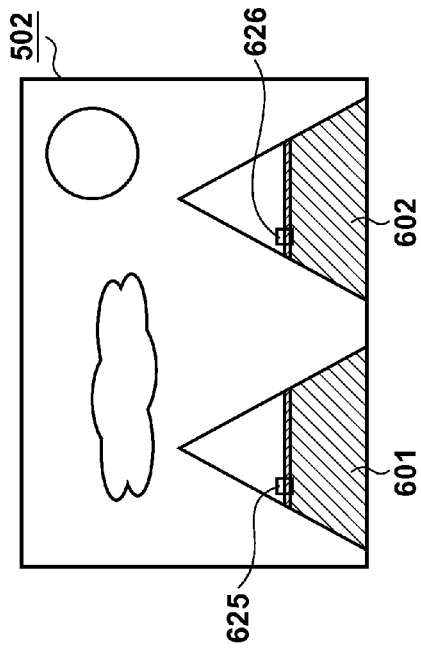
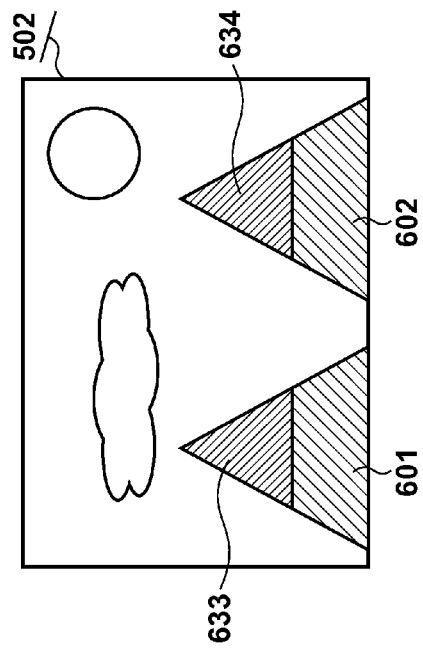
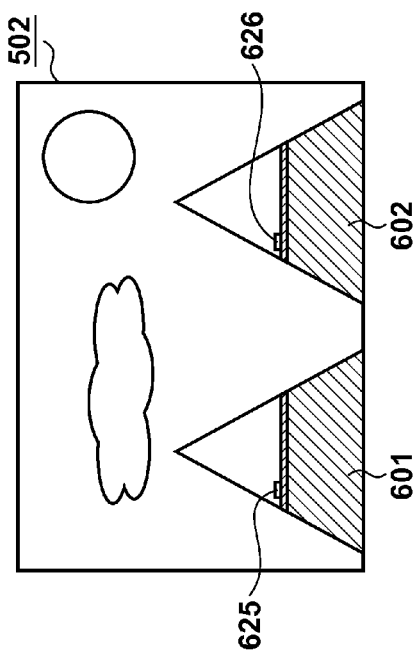

IMAGE PROCESSING APPARATUS AND METHOD THEREFOR

BACKGROUND OF THE INVENTION

Field of the Invention

The present invention relates to image processing for detecting the altered regions of an image.

Description of the Related Art

Alin C. Popescu, Hany Farid "Exposing Digital Forgeries by Detecting Duplicated Image Regions" TR2004-515, Dartmouth College, Computer Science (to be referred to as literature 1 hereinafter) has proposed a technique of detecting the alteration of the image captured by a compact digital camera, single-lens reflex camera, or the like. This technique detects altered regions using the feature amount of each partial region of a captured image without embedding additional information such as a digital watermark in the captured image, thereby suppressing image quality degradation or an increase in processing time due to information embedding.

It is often a case that a captured image is altered by copying a partial region of the image to another region of the image (to be referred to as "internal copy" hereinafter). For example, a captured image is altered by copying human images included in the captured image to increase the number of people included in the captured image, thereby making the captured image look better.

When an image is altered by internal copy, the feature amount of a copy-source image region (to be referred to as a "copy-source region" hereinafter) is equal or approximate to that of a copy-destination image region (to be referred to as a "copy-destination region" hereinafter). The technique in literature 1 acquires a feature amount using principal component analysis for each image region (for example, each 4×4 pixel region) of a captured image and detects, as an altered region, a region pair (to be referred to as a "copy pair" hereinafter) equal in feature amount within the same image.

If, however, each altered region formed by internal copy partially includes a flat image region, the technique in literature 1 cannot detect the flat region as an altered region.

A flat image region is an image region like a sea or sky region with almost uniform pixel values (for example, RGB component values) in the region. That is, the feature amount acquired from a flat image region does not become a unique value because of almost uniform pixel values, and hence tends to become similar to the feature amount of another flat image region. This makes it impossible to specify a copy pair which are approximate in feature amount in flat image regions. Such regions are therefore not detected in spite of the fact that the regions are altered regions.

SUMMARY OF THE INVENTION

In one aspect, an image processing apparatus comprises: an acquisition unit configured to divide input image data into blocks each including a plurality of pixels, and to acquire feature amounts of the blocks; a first detection unit configured to detect a pair of two blocks whose feature amounts are approximate to each other, and to extract a first aggregate area in which one block of each of the pairs gathers and a second aggregate area in which the other block of each of the pairs gathers from the input image data; and a second detection unit configured to perform additional detection of adding a block adjacent to the first aggregate area to the first aggregate area, and adding a block adjacent to the second aggregate area to the second aggregate area.

According to the aspect, it is possible to improve the detection accuracy for altered regions formed by internal copy.

Further features of the present invention will become apparent from the following description of exemplary embodiments with reference to the attached drawings.

BRIEF DESCRIPTION OF THE DRAWINGS

FIGS. 3A to 3D are views for explaining an example of the extraction of a copy pair by a detection unit.

FIGS. 5A to 5D are views for explaining an example of a method of extracting a block pair using the detection unit.

FIGS. 8A and 8B are views for explaining the enlargement of erroneously detected regions.

FIGS. 10A and 10B are views each showing an example of a block.

FIGS. 13A to 13H are views for explaining additional detection when the overlap of blocks is permitted.

DESCRIPTION OF THE EMBODIMENTS

Image processing according to the embodiments of the present invention will be described in detail below with reference to the accompanying drawings.

First Embodiment

Arrangement of Apparatus

Figure 1:
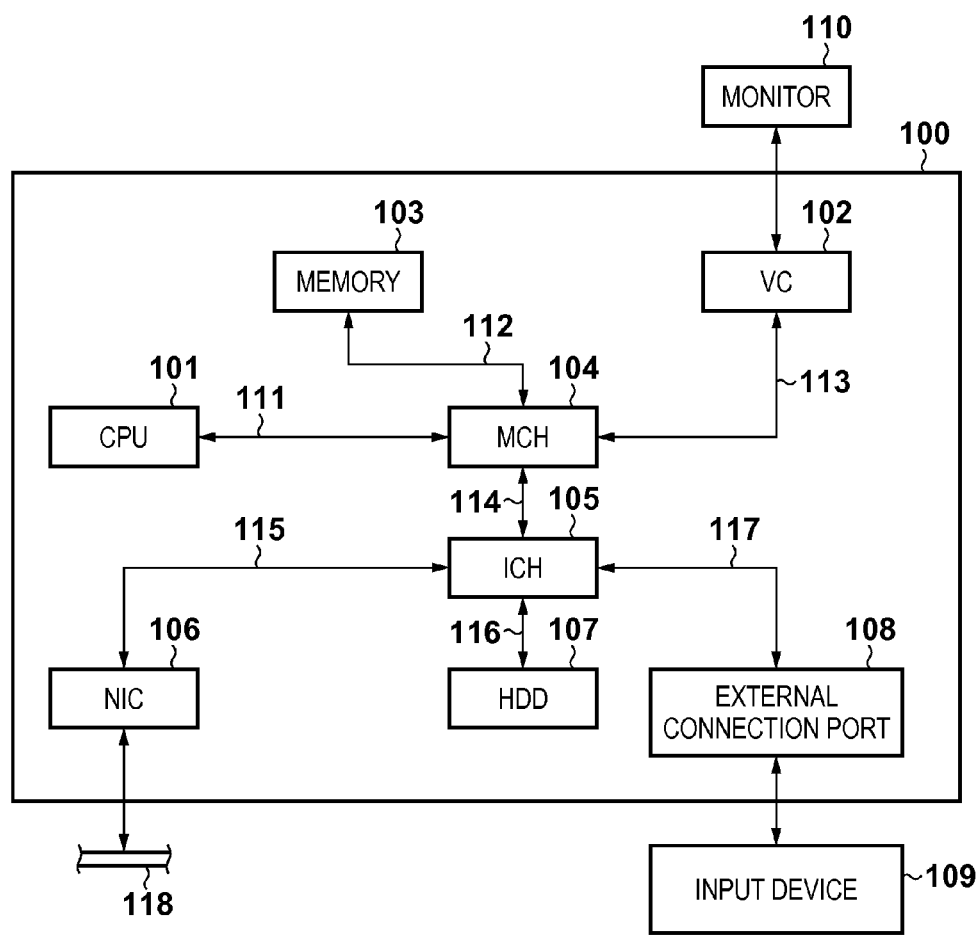
FIG. 1 is a block diagram showing the arrangement of an image processing apparatus according to an embodiment.

The block diagram of FIG. 1 shows the arrangement of an image processing apparatus 100 according to an embodiment.

A microprocessor (CPU) 101 controls all or part of the operation of the image processing apparatus 100 by executing programs stored in a memory 103 or an HDD (Hard Disk Drive) 107 while using the memory 103 as a work memory. Note that the memory 103 includes a RAM (Random Access Memory) and a ROM (Read Only Memory). A VC (Video Controller) 102 performs control to display a window constituted by images, characters, and the like on a monitor 110 in accordance with an instruction from the CPU 101.

An MCH (Memory Controller Hub) 104 is a so-called "north bridge" for controlling data transfer between the CPU 101, the VC (Video Controller) 102, the memory 103, and an ICH (Input/output Controller Hub) 105 via links 111 to 114. The ICH 105 is a so-called "south bridge" for controlling data transfer between a NIC (Network Interface Card) 106, the HDD 107, and an external connection port 108 via links 115 to 117. Note that the links 115 to 117 are, for example, a parallel or serial bus such as PCI and PCI Express® and serial buses such as SATA (Serial ATA) and USB (Universal Serial Bus).

The NIC 106 is a communication interface for connection to a wired or wireless network 118. The HDD 107 stores an OS (Operating System) executed by the CPU 101, various types of programs, various types of data, and the like. The external connection port 108 is a serial bus port such as a USB or IEEE1394 port for connecting an external device to the image processing apparatus 100. Connecting an input device 109 to the external connection port 108 allows the image processing apparatus 100 to acquire data from the input device 109. Note that the input device 109 is a device which inputs data to the image processing apparatus 100 via the external connection port 108. For example, the input device 109 is a pointing device including a keyboard and a mouse, an imaging device such as a digital camera, or an image input device. Preparing an HDMI® (High-Definition Multimedia Interface) port as the external connection port 108 can connect the monitor 110 to the external connection port 108.

Note that the image processing apparatus 100 can be implemented by supplying programs for executing the processing (to be described later) to a personal computer.

[Functional Arrangement]

The functional arrangement of the image processing apparatus 100 will be described with reference to the block diagram of FIG. 2. This functional arrangement is implemented when the CPU 101 executes image processing programs according to this embodiment.

An image input unit 201 inputs image data from the input device 109 via the external connection port 108 and stores the input image data in a predetermined area in the memory 103 or HDD 107. The input image data is image data representing the image captured by a digital camera. The data format of this data conforms to JPEG (Joint Photographic Experts Group), TIFF (Tagged Image File Format), or RAW. Note that the input image data may be graphic data representing an illustrative image.

Feature Amount Acquisition Unit

A feature amount acquisition unit 202 acquires a feature amount of the image represented by input image data for each first unit region. The first unit region is, for example, a small region (a block including a plurality of pixels) including 4×4 pixels or 8×8 pixels. The feature amount acquisition unit 202 acquires a feature amount using, for example, principal component analysis. If, for example, the image represented by input image data includes 512×512 pixels and the first unit region includes 4×4 pixels, the feature amount acquisition unit 202 acquires feature amounts corresponding to a total of 128 blocks.

When acquiring a feature amount, the feature amount acquisition unit 202 may divide the image so as to prevent the first unit regions from overlapping each other or may divide the image so as to move the first unit region in the horizontal or vertical direction pixel by pixel. Assume that the image includes 512×512 pixels and the first unit region includes 4×4 pixels. In this case, the feature amount acquisition unit 202 moves the first unit region in the horizontal direction pixel by pixel a total of 512−4+1 times and also moves the region in the vertical direction pixel by pixel a total of 512−4+1 times to acquire feature amounts corresponding to a total of 509×509 blocks.

The feature amount of each block is linked to the position of the block on the image data, for example, the coordinates of the upper left pixel of the block. The position indicated by the coordinates of the upper left pixel of a block will be referred to as the "block position" hereinafter.

For the sake of descriptive convenience, the following will exemplify a case in which an image is divided so as to prevent blocks corresponding to the first unit regions from overlapping each other. However, dividing an image so as to make blocks overlap each other can detect altered regions with higher accuracy.

First Detection Unit

A detection unit 203 as the first detection unit extracts a copy pair included in input image data by internal copy using the feature amounts acquired by the feature amount acquisition unit 202 and the block positions of the feature amounts.

An example of the extraction of a copy pair by the detection unit 203 will be described with reference to FIGS. 3A to 3D. Referring to FIG. 3A, image data 500 indicates an image before alteration, and input image data is image data 502 representing the altered image obtained by adding a triangle 503 as a copy of a triangle 501 having a white top portion 504. Note that the top portion 504 of each of the triangles 501 and 503 is a flat image region.

As shown in FIG. 3B, the detection unit 203 compares the feature amount of a target block 505, which corresponds to the first unit region of the image data 502, with that of another block 506. If the feature amount of the target block 505 is equal to that of the comparison target block (to be referred to as the "comparison block" hereinafter) 506 or the difference between the feature amounts is equal to or less than a predetermined threshold (the feature amounts are approximate to each other), the detection unit 203 detects the target block 505 and the comparison block 506 as a block pair which is a copy pair candidate. The detection unit 203 performs such feature amount comparison with respect to all the blocks to detect a block pair in the image data 502.

When detecting a block pair, the detection unit 203 sorts blocks by dictionary-order sort of feature amounts in order to efficiently compare feature amounts, in other words, in order to efficiently grasp blocks whose feature amounts are approximate to each other. Blocks sorted adjacent to each other are blocks which exhibit the highest possibility of being a copy pair. The detection unit 203 efficiently detects a block pair by comparing the feature amounts of adjacent blocks with each other.

The detection unit 203 then performs the following processing to prevent erroneous detection of a copy pair. If the distance between the two blocks of a block pair is small, the feature amounts tend to be approximate due to the continuity of image components. For this reason, such two blocks tend to be erroneously detected as a copy pair. If, therefore, the distance between the two blocks of a block pair is small, the detection unit 203 excludes the block pair from copy pair candidates. For example, the detection unit 203 performs determination according to the following equation to exclude any block pair the distance between which (to be referred to as an "inter-block distance D" hereinafter) is less than a predetermined distance (D<th1) from copy pair candidates, and leaves any block pair whose inter-block distance is equal to or more than the predetermined distance (D≥th1) as a copy pair candidate.

$$D=\sqrt{(\Delta x^2+\Delta y^2)} < th1 \tag{1}$$

where Δx=x−x', Δy=y−y', and (x, y) and (x', y') represent block positions.

Referring to FIG. 3C, the detection unit 203 extracts a block pair of blocks 507 and 508 the inter-block distance D between which is large as a copy pair, and excludes a block pair of blocks 509 and 510 the inter-block distance D between which is small from copy pair candidates.

An altered region forms an object having a meaning as a pixel set such as a copy of a human image or a copy of an article image, and hence becomes a region having a certain size. Assume that the detection unit 203 has detected an isolated block pair including only small blocks such as blocks each having the size of the first unit region (for example, 4×4 pixels). In this case, it is highly possible that the detection unit 203 has detected blocks whose feature amounts are accidentally approximate to each other. In other words, in a copy-source region and copy-destination region originating from internal copy, the blocks of copy pairs are more likely to form a set (to be referred to as a "copy set" hereinafter). Extracting a copy pair constituted by blocks included in a copy set makes it possible to prevent a detection error.

In this case, as shown in FIGS. 3A to 3D, in order to make a description by presenting the relationship between an image before alteration and an image after alteration, a copy-source region and a copy-destination region originating from internal copy are explicitly presented. This embodiment is configured to extract a region in which one block of each copy pair gathers and a region in which the other block of each copy pair gathers. However, to decide which one of the regions is a copy-source region or copy-destination region is not an object of the present invention. However, the following description is premised on the relationship shown in FIGS. 3A to 3D, and hence sometimes uses expressions like "copy-source region" and "copy-destination region".

Referring to FIG. 3D, when the detection unit 203 detects blocks 511 and 512 as a block pair, since there exists neither block pair nor copy set near the block pair, the detection unit 203 excludes the block pair of the blocks 511 and 512 from copy pair candidates. In contrast to this, a block pair of blocks 513 and 514, a block pair of blocks 515 and 516, and a block pair of blocks 517 and 518 form a copy set. The detection unit 203 extracts these block pairs as copy pairs.

The block pairs forming the copy set have characteristics that the inter-block distances D of the respective block pairs are almost equal to each other, and the block positions are close to each other. The detection unit 203 therefore sorts the order of block pairs by, for example, natural order sort of the inter-block distances D, and further sorts the order of the block pairs by raster-order sort of the block positions.

The detection unit 203 detects, as copy set candidates, block pairs, differences ΔD between the inter-block distances D of which are less than a predetermined threshold (ΔD<th2), and the block positions of which are close to each other. The detection unit 203 then counts the number of block pairs included in each copy set candidate, and determines, as a copy set, a copy set candidate whose count of block pairs is equal to or more than a predetermined number (count≥th3).

In the following description, a copy set in a copy-source region will be referred to as a "copy-source set", and a copy set in a copy-destination region will be referred to as a "copy-destination set". The copy-source set and copy-destination set detected by the detection unit 203 will be collectively referred to as the "first altered regions". In addition, a region in which one block of each copy pair gathers will sometimes be referred to as the "first aggregate area", and a region in which the other block of each copy pair gathers will sometimes be referred to as the "second aggregate area".

Second Detection Unit

A detection unit 204 as the second detection unit detects altered regions in flat image regions which cannot be detected by the detection unit 203, using the feature amounts acquired by the feature amount acquisition unit 202 and the detection results obtained by the detection unit 203.

The detection unit 203 as the first detection unit sorts feature amounts by dictionary-order sort, and detects adjacent blocks having feature amounts as a copy pair having approximate feature amounts. If, however, there are a plurality of other blocks having the same feature amount, the adjacent blocks are not necessarily a copy pair. For example, blocks which are two blocks away from each other are sometimes a true copy pair. In this case, the detection unit 203 cannot properly detect a copy pair. The detection unit 204 performs additional detection of altered regions which cannot be detected by the detection unit 203 described above.

Figure 4A:
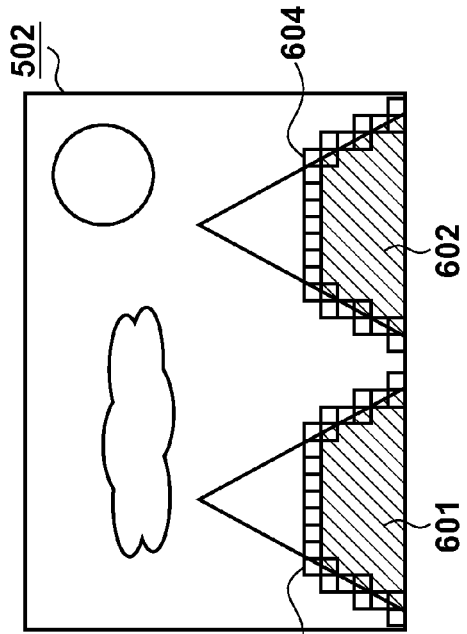
FIGS. 4A to 4D are views for explaining the detection of altered regions in flat image regions by the detection unit.

The detection of altered regions in flat image regions by the detection unit 204 will be described with reference to FIGS. 4A to 4D. Referring to FIG. 4A, the detection unit 203 extracts the bottom portions of the triangles 501 and 503 of the image data 502 as first altered regions 601 and 602. However, the top portions of the triangles 501 and 503 as flat image regions are not extracted as the first altered regions. Note that the first altered region 601 is the first aggregate area, and the first altered region 602 is the second aggregate area.

Figure 4B:
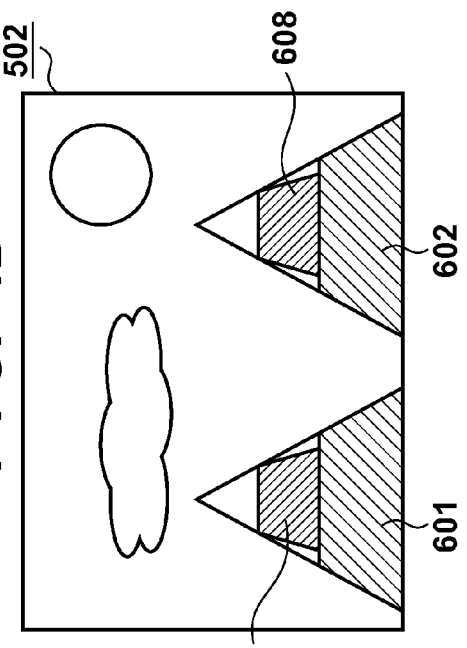
Figure 4C:
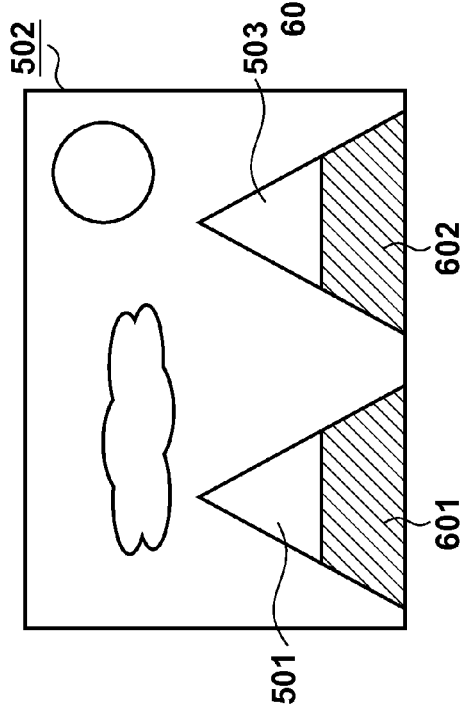

As shown in FIG. 4B, the detection unit 204 compares the feature amounts of blocks 603 and 604 adjacent to the first altered regions 601 and 602, and adds a block pair whose feature amounts are approximate to each other, as a copy pair, to the altered regions. As shown in FIG. 4C, regions 605 and 606 as a block pair whose feature amounts are approximate to each other are added as altered regions.

Figure 4D:
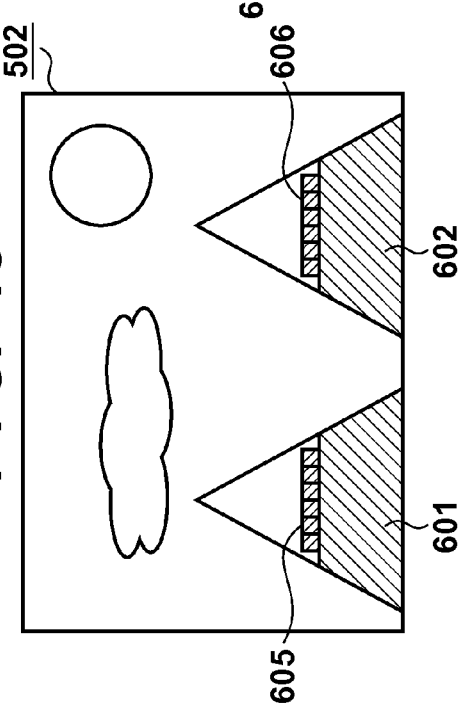

The detection unit 204 then repeats the additional detection of comparing the feature amounts of blocks adjacent to the added altered regions 605 and 606 to detect a copy pair and adding the detected copy pair to the altered regions. Repeating the additional detection will expand the altered regions. FIG. 4D shows altered regions 607 and 608 which are not detected by the detection unit 203 and are extracted by the detection unit 204.

Note that the detection unit 204 extracts altered regions with respect to blocks which do not overlap the first altered regions 601 and 602. That is, the detection unit 204 performs additional detection of altered regions with respect to only the blocks which have not been extracted as altered regions by the detection unit 203.

An example of the block pair extraction method performed by the detection unit 204 will be described with reference to FIGS. 5A to 5D. First of all, the detection unit 204 targets at a block 609 adjacent to the first altered region 601 (FIG. 5A). The detection unit 204 then acquires an x-direction component dx and a y-direction component dy of the inter-block distance D between a block 610 adjacent to the altered region 601 adjacent to the target block 609 and a block 611 in the altered region 602 which forms a copy pair together with the adjacent block 610 (FIG. 5B). The detection unit 204 pairs a block 612 spaced apart from the target block 609 by the distance dx in the x direction and the distance dy in the y direction with the target block 609 (FIG. 5C).

Performing the above processing for all the blocks adjacent to the first altered region 601 will decide the block pair of the block 603 and 604 shown in FIG. 4B. The detection unit 204 further repeats the above processing for blocks adjacent to the added altered regions 605 and 606 shown in FIG. 4C.

Upon detecting a block pair, the detection unit 204 compares the feature amounts of the block pair. If the feature amounts are equal or approximate to each other, the detection unit 204 extracts the block pair as a copy pair and adds it to the altered regions. Referring to FIG. 5D, the detection unit 204 extracts a block pair of blocks 613 and 614, of the block pairs, which have feature amounts equal to each other as a copy pair and adds it to the altered regions. The detection unit 204 does not extract a block air of blocks 615 and 616 whose feature amounts are not equal to each other as a copy pair.

Output Unit

An output unit 205 outputs the altered region extraction result obtained by the detection unit 203 and the altered region extraction result obtained by the detection unit 204. For example, the monitor 110 visualizes and displays the extraction results as alteration detection results on the input image data. The monitor 110 performs this visualization by, for example, overlapping the outlines of rectangular frames representing blocks constituting alteration detection regions, the outlines of the regions, the outlines of rectangular frames representing a copy-source set and a copy-destination set, the outlines of the copy-source set and copy-destination set, and the like on the image represented by input image data.

[Alteration Detection Processing]

Alteration detection processing will be described with reference to the flowchart of FIG. 6.

The image input unit 201 inputs the image data of a captured image (S301). The feature amount acquisition unit 202 divides the input image data into blocks (S302), and acquires the feature amount of each block (S303).

The detection unit 203 compares the feature amounts of blocks using the acquired feature amounts and detects a block pair whose feature amounts are equal or approximate to each other (S304). The detection unit 203 then extracts a copy pair from the respective block pairs by checking the inter-block distances D or determining whether the respective blocks are included in a copy set (S305). If the user wants to extract altered regions within a short period of time to, for example, check the presence/absence of alteration or extract the outlines of altered regions, the detection unit 203 may skip the processing in step S305 and set the block pair detected in step S304 as a copy pair. The detection unit 203 then outputs the extracted copy pair as the first altered regions to the detection unit 204 and the output unit 205 (S306).

When the detection unit 203 completes the processing, the detection unit 204 detects a block pair adjacent to the first altered regions (S307). The detection unit 204 compares the feature amounts of the detected block pair (S308), and adds a block pair whose feature amounts are equal or approximate to each other as a copy pair to the second altered regions (S309). The detection unit 204 then determines whether the copy pair is added to the second altered regions (S310). If the copy pair is added, the process returns to step S307 to detect a block pair adjacent to altered regions. Upon determining that no copy pair is added, the detection unit 204 outputs the second altered regions to the output unit 205 (S311).

When the detection unit 204 completes the processing, the output unit 205 outputs the first and second altered regions (S312).

Figure 7:
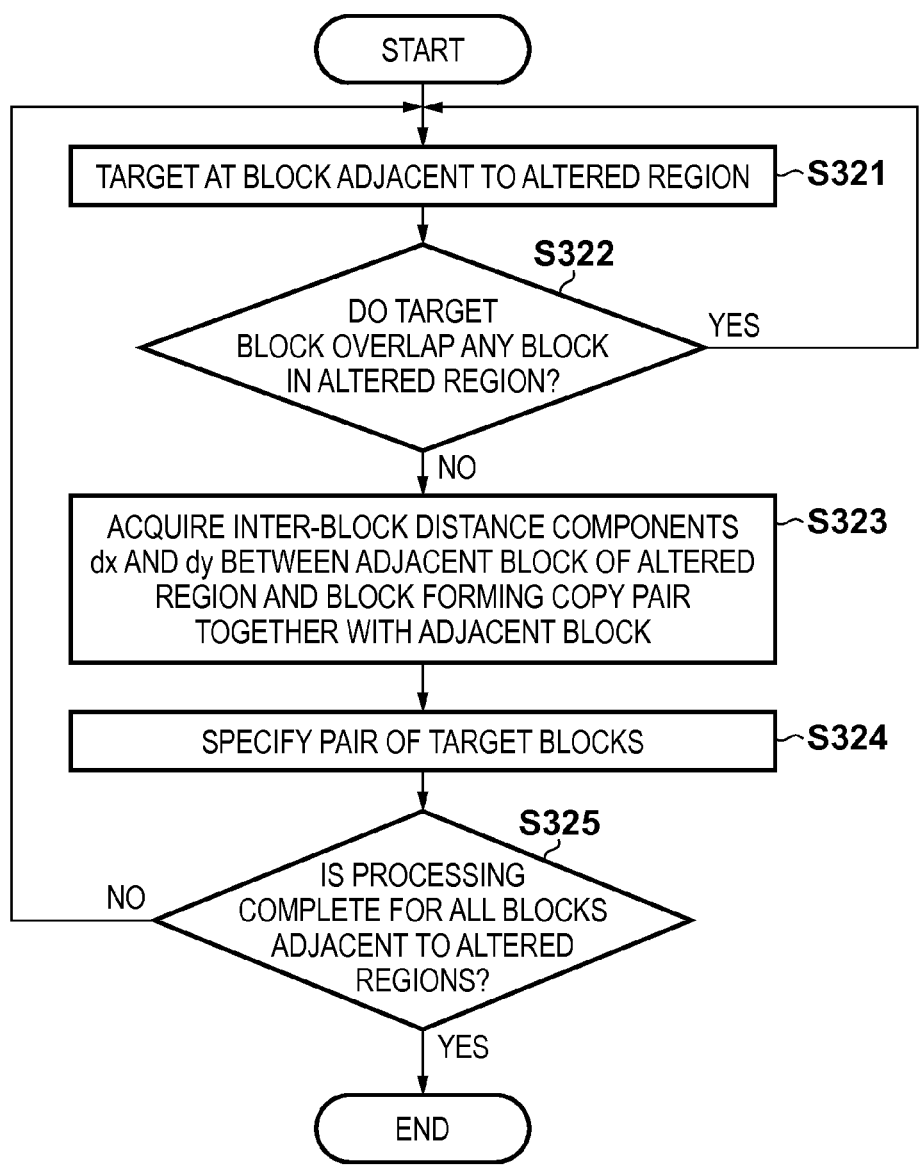
FIG. 7 is a flowchart for explaining the detection of a block pair adjacent to altered regions.

The detection (S307) of a block pair adjacent to altered regions will be described with reference to the flowchart of FIG. 7.

The detection unit 204 targets at a block adjacent to an altered region (S321), and determines whether the target block overlaps the altered region (S322). If they overlap, the process returns to step S321 to target at another block adjacent to the altered region.

If the target block does not overlap any block of the altered region, the detection unit 204 acquires the components dx and dy of the inter-block distance D between an adjacent block of the altered region adjacent to the target block and a block forming a copy pair together with the adjacent block (S323). The detection unit 204 then specifies the block spaced apart from the target block by the distances dx and dy as a block pairing with the target block (S324).

The detection unit 204 repeats the processing from step S321 to step S324 until determining in step S325 that the above processing is complete for all the blocks adjacent to the altered region.

Note that the altered region handled in the processing from step S321 to step S324 after the process shifts from step S306 to step S307 is the first altered region. The altered region handled in the processing from step S321 to step S324 after the process returns from step S325 to step S321 is the unconfirmed (during addition of a copy pair) second altered region.

Comparing the feature amounts of limited block pairs near the first altered regions in this manner makes it possible to detect a copy pair even if flat image regions whose feature amounts are not unique are included in the altered regions. In other words, it is possible to improve the detection accuracy for altered regions originating from internal copy.

The detection unit 204 can also perform additional detection of a copy pair by comparing the pixel values of the pixels in blocks instead of feature amounts. Although additional detection using pixel values will be described below with reference to the flowchart of FIG. 14, this processing differs from that shown in FIG. 6 in that the comparison of feature amounts changes to the comparison of pixel values (steps S351 and S352).

The detection unit 204 compares the pixel values of adjacent block pairs detected in step S307 (S351), and adds a block pair whose pixel values are equal or approximate to each other as a copy pair to the second altered regions (S352).

Figure 16:
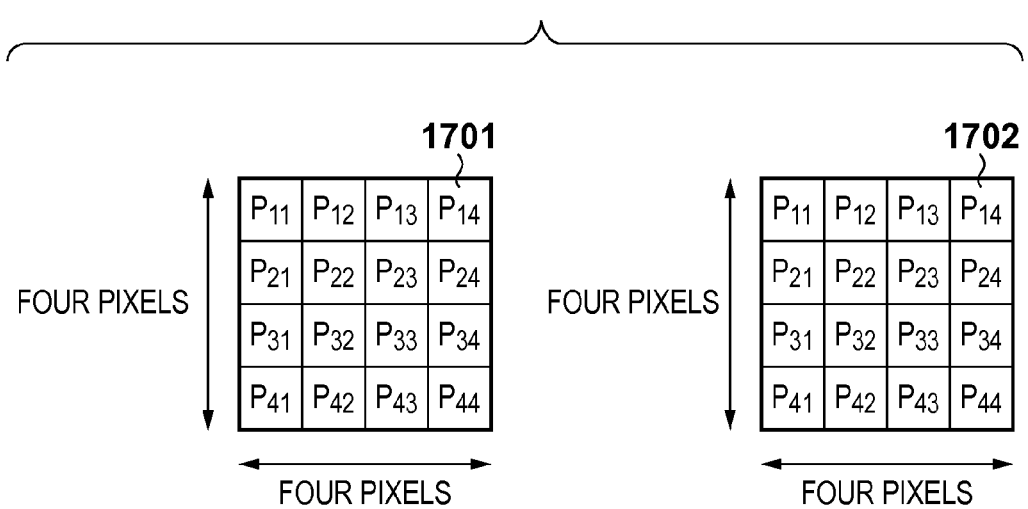
FIG. 16 is a view for explaining the comparison between the pixel values of blocks.

The comparison of pixel values is implemented by comparing the pixel values of all the pixels in blocks, for example, the RGB component values or luminance values, on a pixel basis. An example of comparing the pixel values of a 4×4 pixel block 1701 with those of a block 1702 will be described with reference to FIG. 16. The detection unit 204 compares the pixel value of a pixel $P_{11}$ of the block 1701 with that of a corresponding pixel $P_{11}$ of the block 1702. Likewise, the detection unit 204 compares the pixel values of pixels $P_{12}, \ldots, P_{44}$, thereby comparing the pixel values of all the corresponding pixels. If the comparison results indicate that the pixel values of all the pixels $P_{11}$ to $P_{44}$ of the block 1701 are equal to those of all the pixels $P_H$ to $P_{44}$ of the block 1702 or the differences between the pixel values are equal to or less than a threshold, the detection unit 204 decides the blocks 1701 and 1702 as a copy pair.

Comparing the pixel values of the respective pixels one to one, that is, comparing them at a pixel level, can specify a copy pair more accurately than by comparing feature amounts which are the feature values of the blocks. Note that since the detection unit 204 compares pixel values between blocks of limited block pairs specified in step S307, the processing time does not increase much even though the detection unit 204 compares the pixel values of the respective pixels in the blocks instead of feature amounts.

Second Embodiment

Image processing according to the second embodiment of the present invention will be described below. Note that the same reference numerals as in the first embodiment denote the same components in the second embodiment, and a detailed description of them will be omitted.

Assume that the first altered regions include erroneously detected regions. In this case, if a detection unit 204 performs additional detection of altered regions, the erroneously detected regions are sometimes enlarged depending on input image data.

The enlargement of erroneously detected regions will be described with reference to FIGS. 8A and 8B. FIG. 8A shows a state in which regions 601, 602, 801, and 802 are detected as the first altered regions, and the regions 801 and 802 of the first altered regions are erroneously detected regions. The detection unit 204 enlarges the altered regions of the erroneously detected regions 801 and 802, and enlarges the erroneously detected region into a region 805, as shown in FIG. 8B.

The detection unit 204 of the second embodiment therefore detects the second altered regions by performing additional detection with respect to only regions, in the first altered regions, which exhibit high possibility of being altered. That is, the detection unit 204 obtains regions 803 and 804 by properly enlarging altered regions by performing additional detection with respect to only regions with high possibility of being altered like the regions 601 and 602 while preventing enlargement of erroneously detected regions by excluding the erroneously detected regions 801 and 802.

[Functional Arrangement]

The functional arrangement of an image processing apparatus 100 according to the second embodiment will be described with reference to the block diagram of FIG. 9. This functional arrangement is implemented when a CPU 101 executes image processing programs according to this embodiment.

Figure 2:
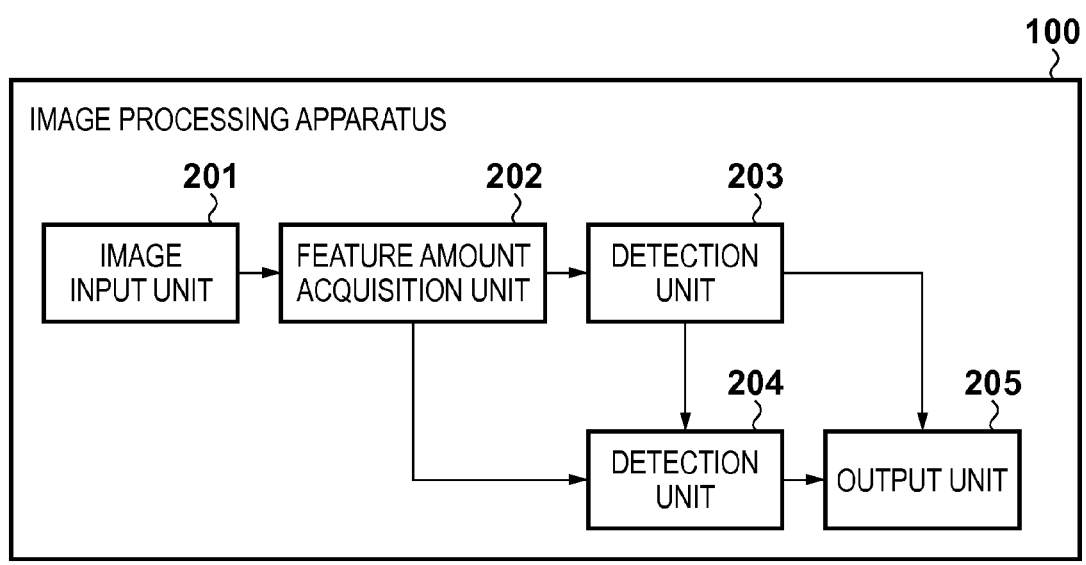
FIG. 2 is a block diagram for explaining the functional arrangement of the image processing apparatus according to the first embodiment.
Figure 9:
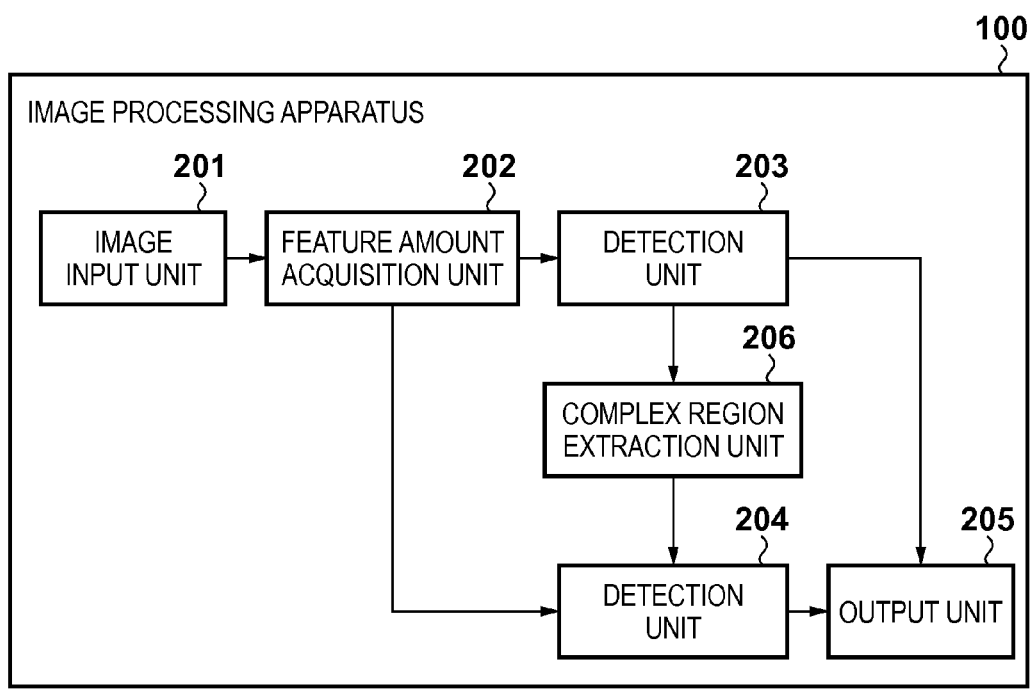
FIG. 9 is a block diagram for explaining the functional arrangement of an image processing apparatus according to the second embodiment.

The functional arrangement according to the second embodiment shown in FIG. 9 differs from that shown in FIG. 2 in that a complex region extraction unit 206 is added. The complex region extraction unit 206 outputs, to the detection unit 204, the first altered regions obtained by extracting regions with high possibility of being altered from the first altered regions output from a detection unit 203, that is, excluding regions with low possibility of being altered.

The complex region extraction unit 206 checks the complexity of an image in each first altered region output from the detection unit 203, and extracts a block included in the region with high possibility of being altered. The complexity can be expressed by, for example, values representing changes in value between the pixels in the block, for example, the differences in luminance value between the pixels in the block. Using such numerical values for complexity can quantitatively indicate whether the image of the block is complex.

FIGS. 10A and 10B each show an example of a block. The block shown in FIG. 10A is a block including 4×4 pixels as the first unit region size, with Pij representing the luminance value of each pixel of the block. Letting i be the row number of a block and j be the column number of the block, $1 \le i \le 4$ and $1 \le j \le 4$. In addition, each luminance value is represented by a linear combination of the R, G, and B component values of the pixel as follows:

$$P_{ij}=0.29891 \times R+0.58661 \times G+0.11448 \times B \quad (2)$$

A complexity Ch in the horizontal direction and a complexity Cv in the vertical direction are represented by sums of luminance value differences in the respective directions.

$$Ch=\Sigma|P_{ij}-P_{ij+1}| (1 \le i \le 4, 1 \le j \le 3)$$

$$Cv=\Sigma|P_{ij}-P_{i+1j}| (1 \le i \le 3, 1 \le j \le 4) \quad (3)$$

As the complexities increase, the image of the block becomes more complex. That is, the image is not uniform and flat, and the feature amount of the block tends to be a unique value. That is, few blocks have feature amounts which are accidentally approximate to the feature amount of a block with a high complexity, and hence the possibility of detection error is low. Therefore, a block pair whose complexities are high and feature amounts are approximate is highly likely to be a copy pair originating from internal copy.

The complex region extraction unit 206 calculates the complexity of each block in each first altered region, extracts blocks having complexities equal to or more than a predetermined threshold as blocks with high possibility of being altered, and outputs a copy pair set constituted by the extracted blocks as altered regions. In other words, the complex region extraction unit 206 outputs, as the first altered regions, regions obtained by excluding blocks with complexities less than the predetermined threshold from the first altered regions.

When considering complexities in the horizontal and vertical directions, one of the following conditions is used as a condition for determining a block having a complex image. The first condition is that the complexities in the two directions are equal to or more than predetermined thresholds (Ch≥th4 && Cv≥th5). The second condition is that at least the complexity in one direction is equal to or more than a predetermined threshold (Ch≥th4||Cv≥th5). It is possible to use one of the conditions depending on the required detection accuracy for altered regions.

The detection unit 204 performs additional detection of altered regions based on the first altered regions narrowed down to regions with high possibility of being altered, which are input from the complex region extraction unit 206.

[Alteration Detection Processing]

Alteration detection processing according to the second embodiment will be described with reference to the flowchart of FIG. 11.

Figure 6:
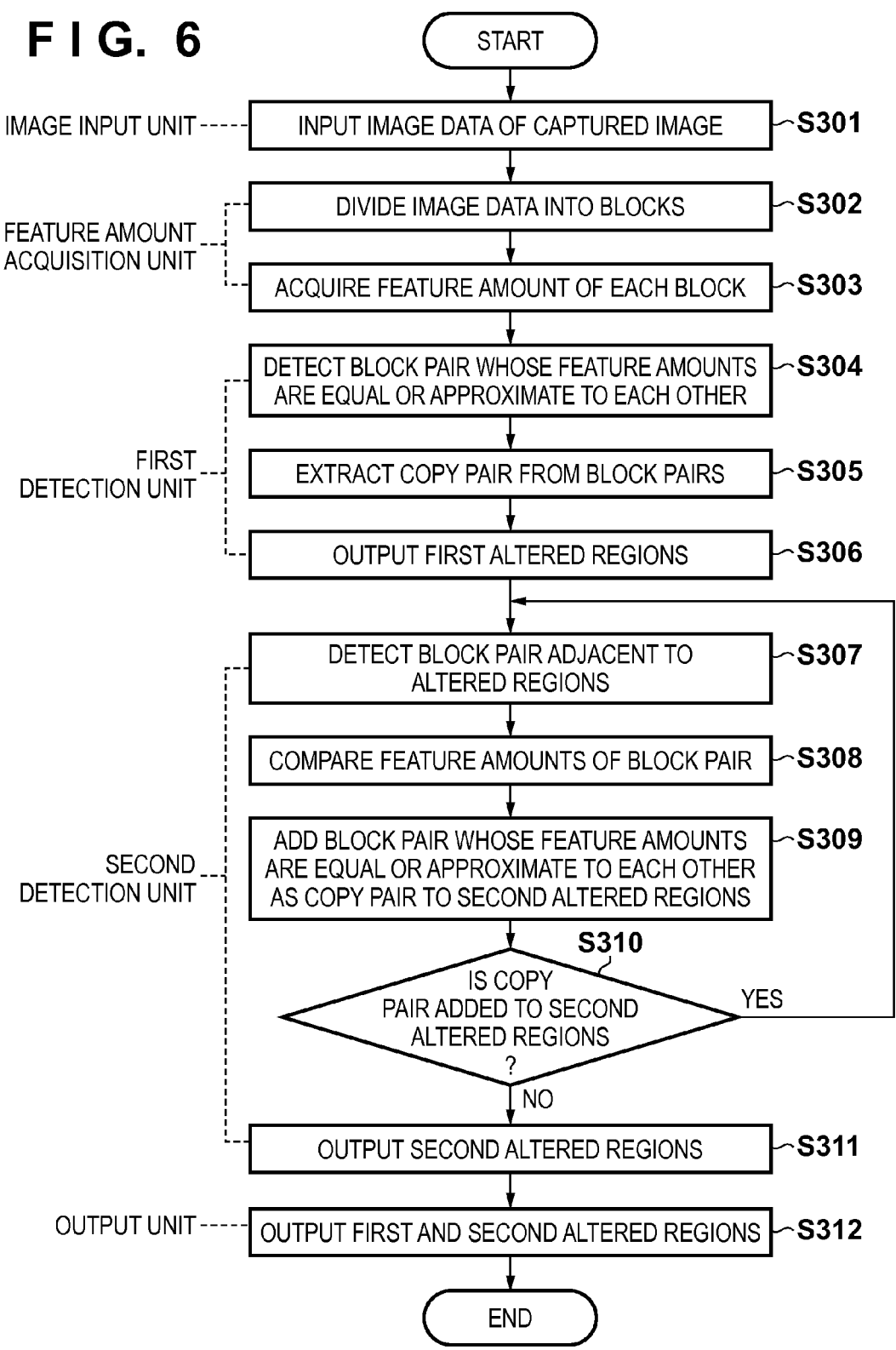
FIG. 6 is a flowchart for explaining alteration detection processing.
Figure 11:
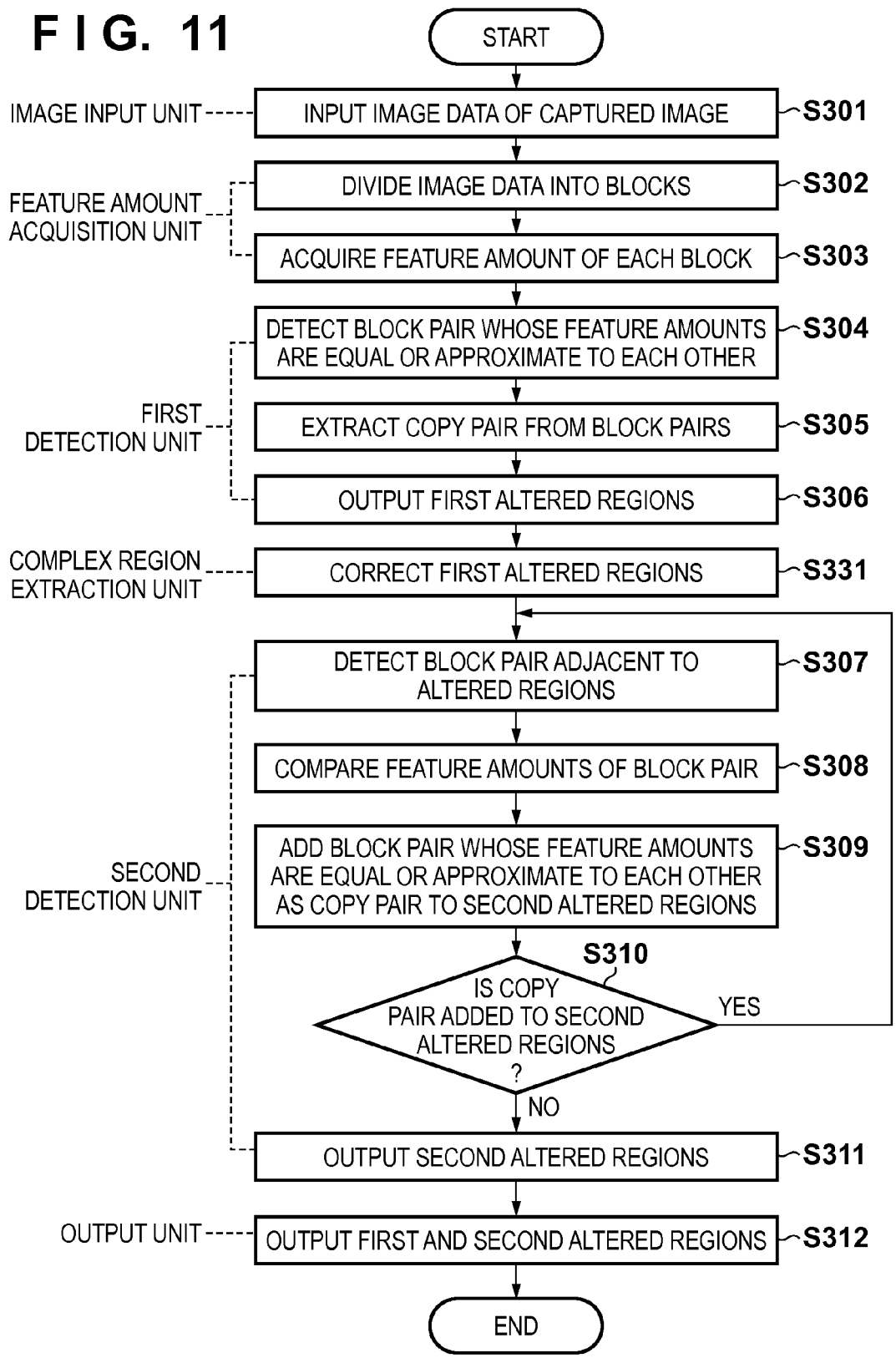
FIG. 11 is a flowchart for explaining alteration detection processing according to the second embodiment.

The alteration detection processing according to the second embodiment shown in FIG. 11 differs from the processing shown in FIG. 6 in that first altered region correction (S331) is added. That is, the detection unit 203 outputs an extracted copy pair as the first altered regions to the complex region extraction unit 206 and an output unit 205 (S306). The complex region extraction unit 206 extracts blocks with complexities equal to or more than a predetermined threshold from the first altered regions and supplies the copy pair set constituted by the extracted blocks as the first altered regions to the detection unit 204 (S331).

Figure 12:
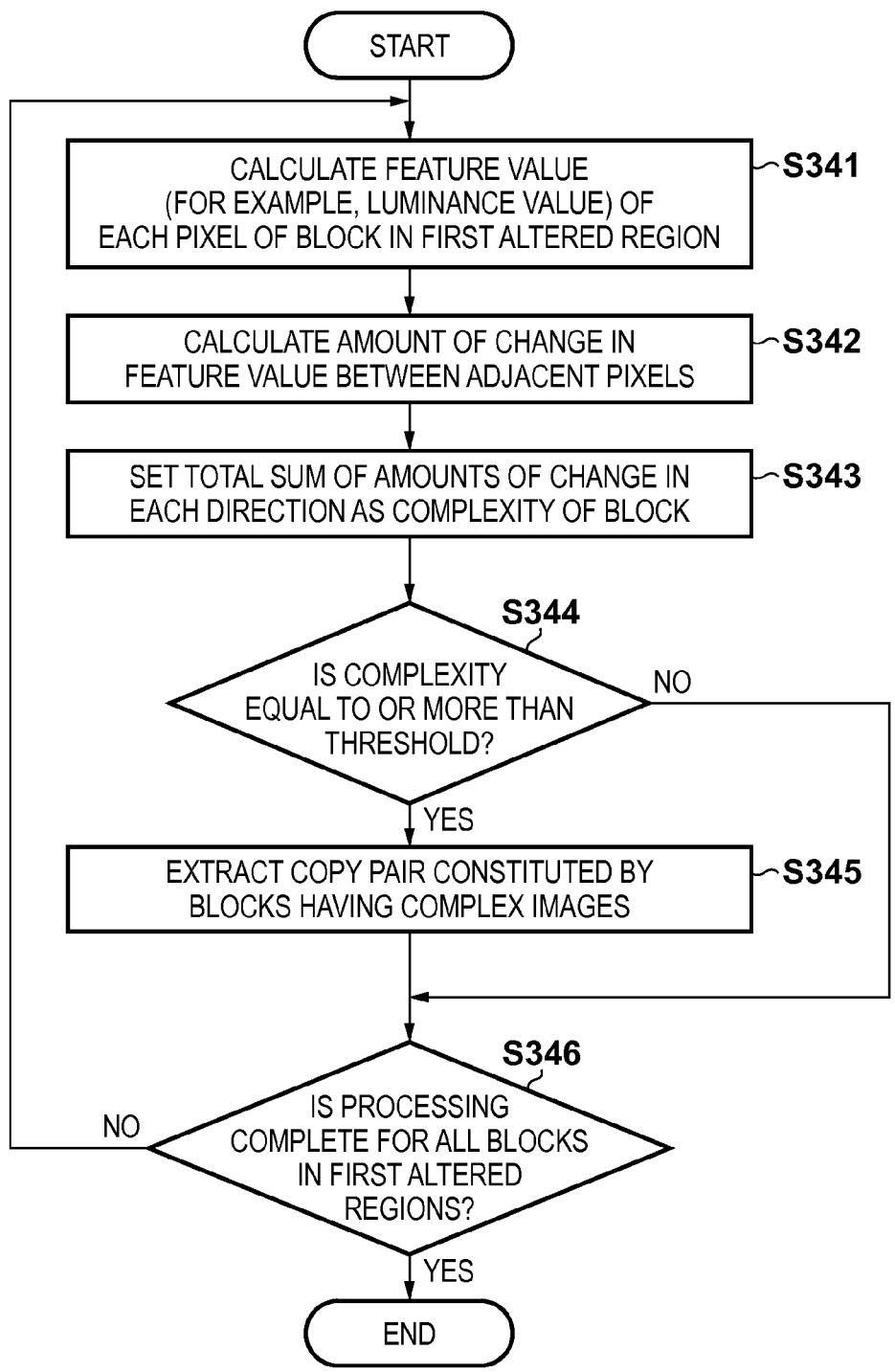
FIG. 12 is a flowchart for explaining the modification of the first altered regions.

The first altered region correction (S331) will be described with reference to the flowchart of FIG. 12.

The complex region extraction unit 206 calculates the feature value of each pixel of a block in each first altered region (S341). A feature value represents a feature of the pixel, and is, for example, a luminance value. The complex region extraction unit 206 calculates the amount of change in feature value between adjacent pixels (S342). The amount of change is, for example, a luminance value difference. The word "adjacent" means that pixels are adjacent in the horizontal direction, vertical direction, or oblique direction.

The complex region extraction unit 206 then calculates the sums of the amounts of change in the respective directions as the complexities of the block (S343), and compares the complexities in the respective directions with predetermined thresholds (S344). The complex region extraction unit 206 extracts a copy pair constituted by blocks having complex images based on the comparison results as altered regions (S345). The complex region extraction unit 206 repeats the processing from step S341 to step S345 until determining in step S346 that all the blocks in the first altered regions are processed.

Note that the complex region extraction unit 206 may use, as a condition for determining that a block has a complex image, one of a condition that the complexities in all the directions are equal to or more than predetermined thresholds and a condition that at least the complexity in on direction is equal to or more than a threshold, in accordance with the required detection accuracy for altered regions.

Figure 14:
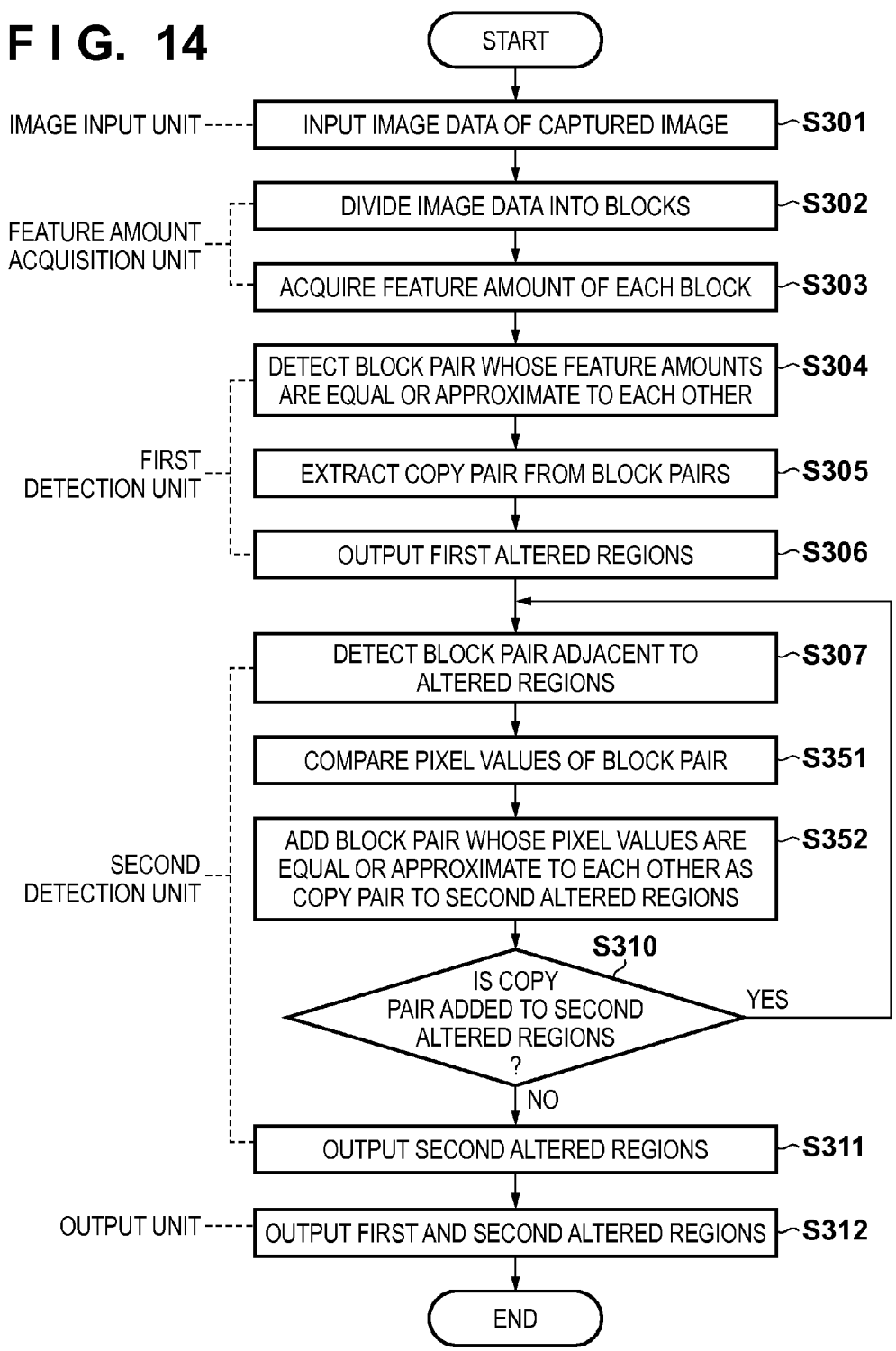
FIG. 14 is a flowchart for explaining additional detection using pixel values in the first embodiment.
Figure 15:
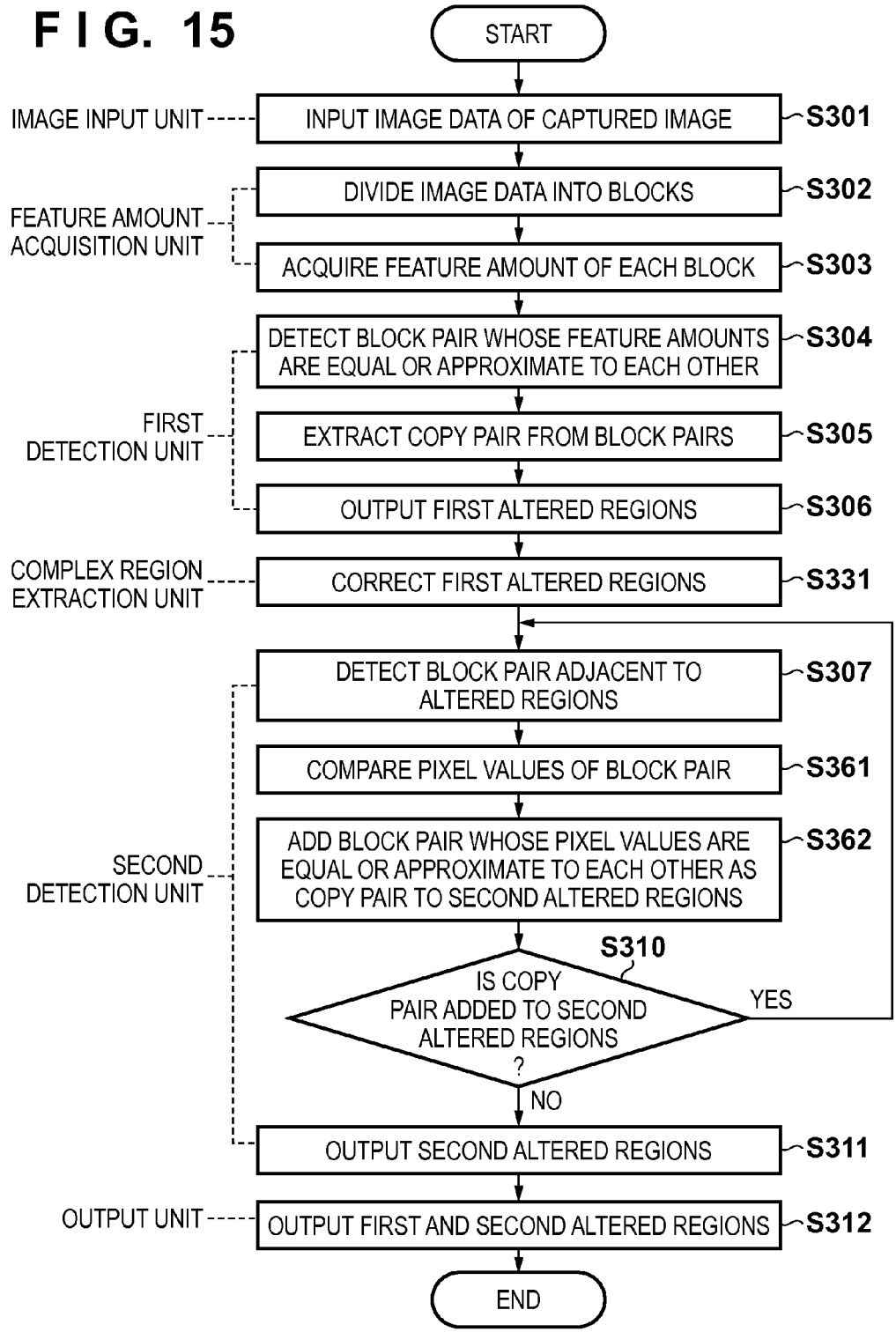
FIG. 15 is a flowchart for explaining additional detection using pixel values in the second embodiment.

In addition, as in the processing shown in FIG. 14 according to the first embodiment, the detection unit 204 can perform additional detection of a copy pair by comparing the pixel values of the pixels in blocks instead of feature amounts. Additional detection using pixel values will be described below with reference to the flowchart of FIG. 15. This processing differs from the processing shown in FIG. 11 in that the comparison of feature amounts changes to the comparison of pixel values (steps S361 and S362).

The detection unit 204 compares the pixel values of adjacent block pairs detected in step S307 (S361), and adds a block pair whose pixel values are equal or approximate to each other as a copy pair to the second altered regions (S362).

The comparison of pixel values can be implemented in the same manner as in the first embodiment. In this case, the detection unit 204 compares blocks at a pixel level, and hence can specify a copy pair more accurately than by comparing feature amounts. Note that since the detection unit 204 compares pixel values between blocks of limited block pairs specified in step S307, the processing time does not increase much even though the detection unit 204 compares the pixel values of the respective pixels in the blocks instead of feature amounts.

Modification of Embodiments

The above embodiments have been described on the premise that when performing additional detection of blocks adjacent to altered regions, the blocks do not overlap each other. However, when performing additional detection while avoiding the overlap of blocks, it is not possible to perform fine additional detection at a pixel level, and parts of the top portions of the triangles 501 and 503 may not be detected as altered regions as shown in FIG. 4D.

In order to improve the detection accuracy for altered regions, it is necessary to permit the overlap of blocks when performing additional detection of blocks adjacent to altered regions. However, permitting the overlap of blocks will increase the number of blocks targeted for additional detection and decrease the processing speed.

Figure 13A:
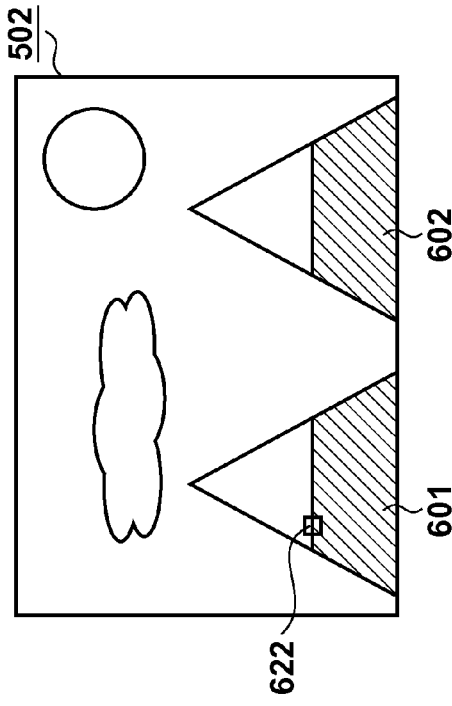

Additional detection performed when the overlap of blocks is permitted will be described with reference to FIGS. 13A to 13H. First of all, a block in the first altered region 601 is moved vertically and horizontally by a predetermined number of pixels, respectively, to set a moved block. Note that it is possible to set any moving amount less than the size of a unit region. For example, if the size of the first unit region is 4×4 pixels, the block can be moved by one to three pixels. Any moved blocks whose pixels are all included in the first altered region 601 are excluded. Moving the block will set a block 621 to which a block shifted outward from an edge of the first altered region 601 by a predetermined number of pixels is adjacent, as shown in FIG. 13A.

Figure 13B:
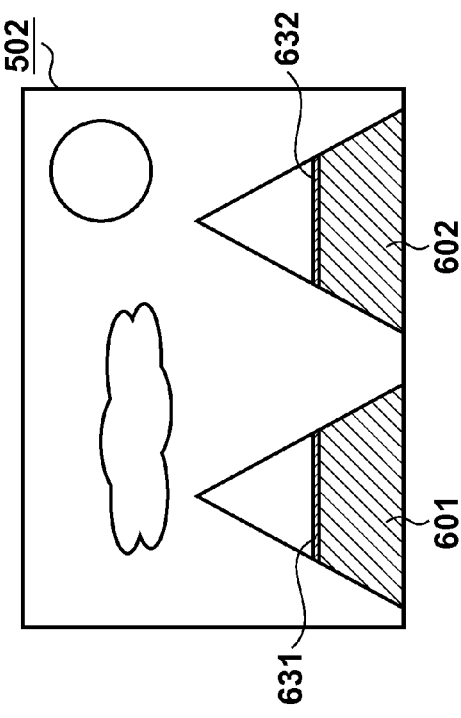
Figure 13C:
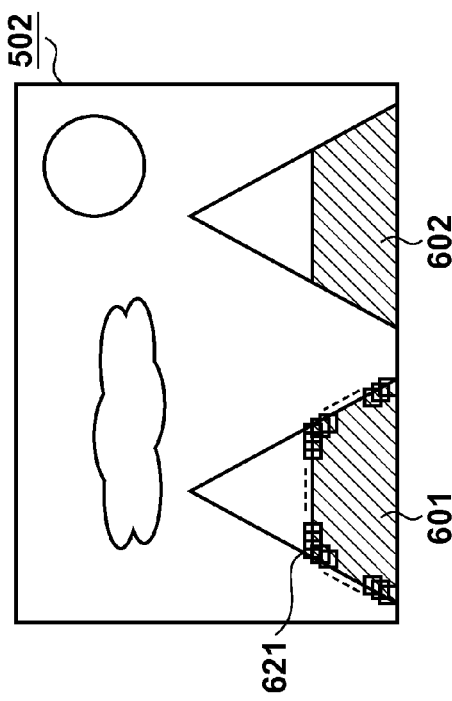

Additional detection will be described next using a target block 622 shown in FIG. 13B, which is one of the blocks 621. As in the first embodiment, this apparatus decides a block 623 pairing with the target block 622 from the inter-block distance between an adjacent block in the first altered region 601 which is adjacent to the target block 622 and a block in the first altered region 602 which pairs with the adjacent block (FIG. 13C). The apparatus then compares the feature amounts of the block pair of the blocks 622 and 623 and adds the pair as a copy pair to the altered regions.

Figure 13D:
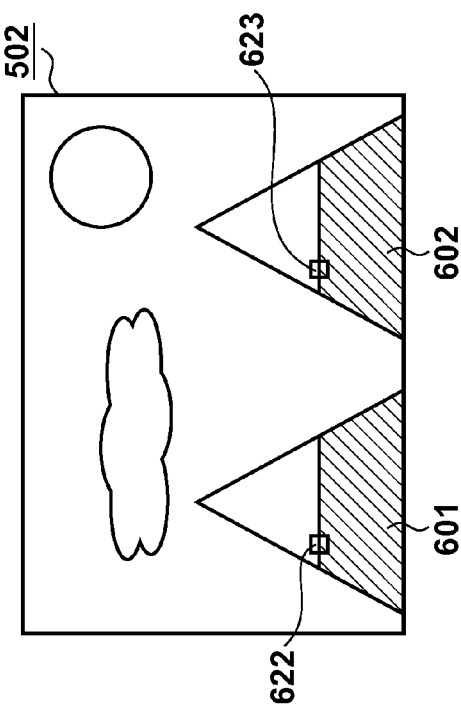

Performing the above processing for all the blocks 621 will add regions 631 and 632 to the altered regions (FIG. 13D). Subsequently, the apparatus sets blocks moved vertically and horizontally relative to the additionally detected altered regions 631 and 632 by predetermined numbers of pixels and excludes any blocks whose pixels are all included in the altered regions, thereby setting blocks 624 (FIG. 13E).

Additional detection will be described next using a target block 625 shown in FIG. 13F which is one of the blocks 624. As in the first embodiment, the apparatus decides a block 626 pairing with the target block 625 (FIG. 13F). The apparatus compares the feature amounts of the block pair of the blocks 625 and 626 and adds the block pair of the blocks 625 and 626 as a copy pair to the altered regions (FIG. 13G). Repeating this processing until there is no block to be added to the altered regions will obtain second altered regions 633 and 634 shown in FIG. 13H.

As described above, if the movement amount of a block is one pixel, the apparatus will repeat the processing of moving the block from an altered region by one pixel and performing additional detection. This can enlarge the altered region on a pixel basis. It is therefore possible to perform additional detection with higher accuracy than the case of inhibiting blocks from overlapping.

The above embodiments have exemplified the case of acquiring feature amounts by principal component analysis, but may use the following feature amounts. For example, it is possible to use feature amounts such as SIFT (Scale-Invariant Feature Transform) or SURF (Speeded Up Robust Feature). In addition, the detection unit 203 as the first detection unit can detect a copy pair depending on whether RGB component values, instead of feature amounts, are equal or approximate to each other.

The above embodiments have exemplified the case of using complexities of images in the horizontal, vertical, and oblique directions. However, it is possible to calculate complexities by another method without using any differences in feature value between pixels in these specific directions. For example, as shown in FIG. 10B, it is possible to generate an array of the feature values of the respective pixels of the block shown in FIG. 10A by arraying them in a line and calculate a complexity from the sum total of the differences between adjacent feature values. In addition, a complexity may be calculated using the average or median value of feature values instead of the sum total of the differences between the feature values. Alternatively, an edge intensity may be used instead of a complexity. That is, a complexity may take any value as long as it represents whether the image of a block is uniform.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-188927 filed Aug. 29, 2012, and 2013-139258 filed Jul. 2, 2013 which are hereby incorporated by reference herein in their entirety.

What is claimed is:

1. An image processing apparatus comprising:
an acquisition unit configured to divide input image data into blocks each including a plurality of pixels, and to acquire feature amounts of the blocks;
a first detection unit configured to detect a pair of two blocks whose feature amounts are approximate to each other, and to extract a first aggregate area in which one block of the pair gathers and a second aggregate area in which the other block of the pair gathers from the input image data; and
a second detection unit configured to perform additional detection of adding a first adjacent block adjacent to the first aggregate area to the first aggregate area, and adding a second adjacent block adjacent to the second aggregate area to the second aggregate area, wherein if the feature amounts of the first and second adjacent blocks are approximate to each other, the addition of the first and second adjacent blocks is performed, wherein a relative positional relationship between the two blocks of the pair is the same as a relative positional relationship between the first adjacent block and the second adjacent block, and wherein at least one of the acquisition unit, the first detection unit, or the second detection unit is implemented at least in part by hardware components of the image processing apparatus.

2. The apparatus according to claim 1, wherein the second detection unit determines a block near the second aggregate area to be a pair with a target block near the first aggregate area based on a relative positional relationship between a first block in the first aggregate area which is adjacent to the target block and a second block in the second aggregate area which forms the pair with the first block.

3. The apparatus according to claim 2, wherein in a case where the feature amounts or pixel values of the target block and the determined block are approximate to each other, the second detection unit performs the additional detection of adding the target block to the first aggregate area and adding the determined block to the second aggregate area.

4. The apparatus according to claim 2, wherein the target block comprises a block including at least one pixel overlapping the first aggregate area.

5. The apparatus according to claim 1, wherein in a case where a relative positional relationship between the two blocks whose feature amounts are approximate to each other is not less than a predetermined relative positional relationship, the first detection unit detects the blocks as the pair.

6. The apparatus according to claim 1, wherein the first detection unit detects a candidate for the first aggregate area and a candidate for the second aggregate area with respect to the plurality of detected pairs based on relative positional relationship differences between the blocks forming each of the detected pairs and positions of the blocks on the image data.

7. The apparatus according to claim 6, wherein the first detection unit extracts the candidates including the pairs not less than a predetermined number as the first aggregate area and the second aggregate area.

8. The apparatus according to claim 1, wherein the second detection unit repeats the additional detection until there is no block to be added to the first aggregate area and the second aggregate area after the additional detection.

9. The apparatus according to claim 1, further comprising an excluding unit configured to supply a region obtained by excluding at least one flat image region from the first aggregate area as the first aggregate area to the second detection unit, and to supply a region obtained by excluding at least one flat image region from the second aggregate area as the second aggregate area to the second detection unit.

10. The apparatus according to claim 9, wherein the excluding unit calculates amounts of change in value of the plurality of pixels in a predetermined direction with respect to each block in the first aggregate area and the second aggregate area, and sets a block exhibiting the amount of change less than a predetermined threshold as the flat image region.

11. The apparatus according to claim 1, further comprising an output unit configured to output the first aggregate area and the second aggregate area as altered regions in the input image data.

12. An image processing method comprising:
using a processor to perform:
dividing input image data into blocks each including a plurality of pixels;
acquiring feature amounts of the blocks;
detecting a pair of two blocks whose feature amounts are approximate to each other;
extracting a first aggregate area in which one block of the pair gathers and a second aggregate area in which the other block of the pair gathers from the input image data; and
performing additional detection of adding a first adjacent block adjacent to the first aggregate area to the first aggregate area, and adding a second adjacent block adjacent to the second aggregate area to the second aggregate area, wherein a relative positional relationship between the two blocks of the pair is the same as a relative positional relationship between the first adjacent block and the second adjacent block, and wherein if the feature amounts of the first and second adjacent blocks are approximate to each other, the addition of the first and second adjacent blocks is performed.

13. A non-transitory computer readable medium storing a computer-executable program for causing a computer to perform an image processing method, wherein the image processing method comprises:
  using a processor to perform:
  dividing input image data into blocks each including a plurality of pixels;
  acquiring feature amounts of the blocks;
  detecting a pair of two blocks whose feature amounts are approximate to each other;
  extracting a first aggregate area in which one block of the pair gathers and a second aggregate area in which the other block of the pair gathers from the input image data; and
  performing additional detection of adding a first adjacent block adjacent to the first aggregate area to the first aggregate area, and adding a second adjacent block adjacent to the second aggregate area to the second aggregate area, wherein a relative positional relationship between the two blocks of the pair is the same as a relative positional relationship between the first adjacent block and the second adjacent block, and wherein if the feature amounts of the first and second adjacent blocks are approximate to each other, the addition of the first and second adjacent blocks is performed.

* * * * *